Sept. 6, 1927.
E. ROUCKA
1,641,196
MEASURING SYSTEM
Filed July 17, 1922
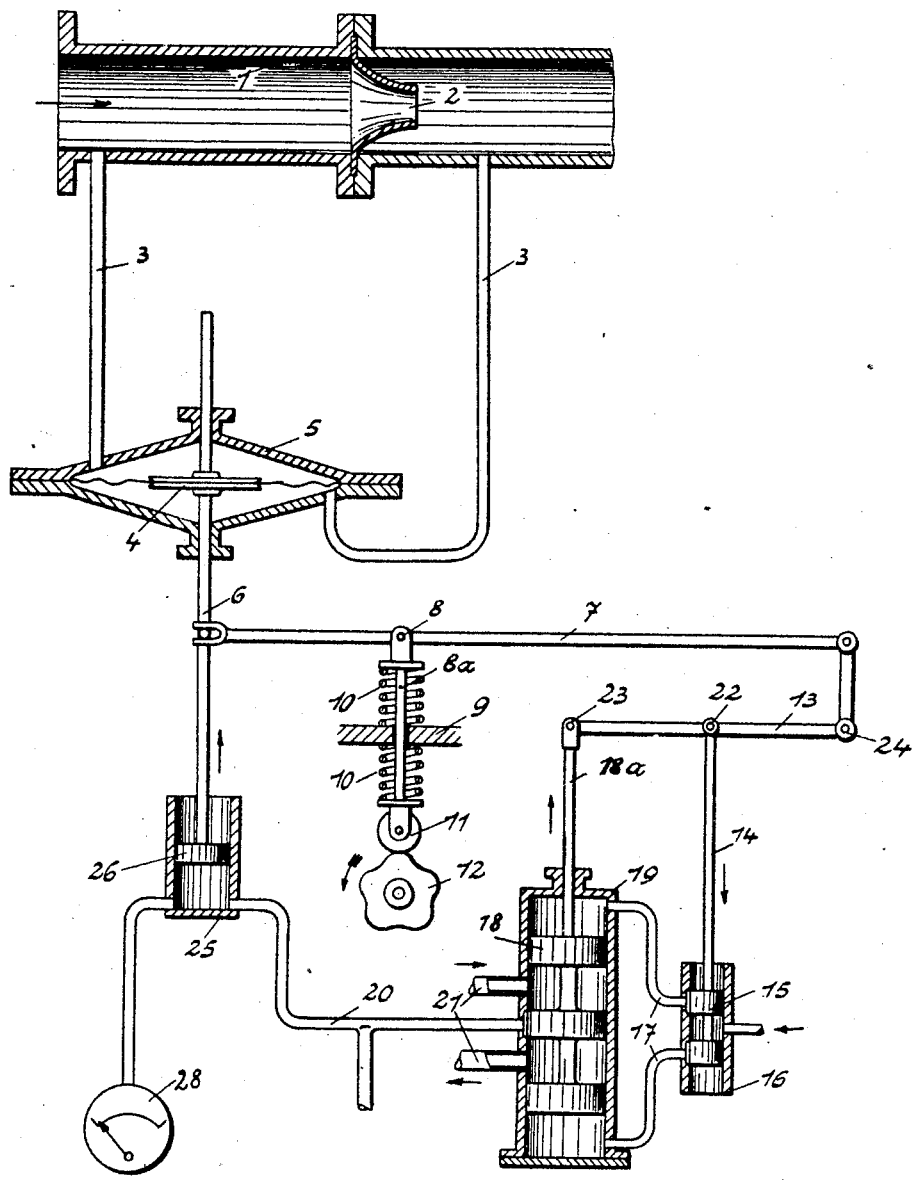
INVENTOR:
Eerich Roucka,
BY
Everett + Rook
ATTORNEYS.

Patented Sept. 6, 1927.

1,641,196

UNITED STATES PATENT OFFICE.

ERICH ROUČKA, OF BLANSKO, CZECHOSLOVAKIA.

MEASURING SYSTEM.

Application filed July 17, 1922, Serial No. 575,754, and in Czechoslovakia September 1, 1921.

This invention relates in general to a system similar to that disclosed in my co-pending application Serial No. 575,746, for transmitting variations or fluctuations in a physical or chemical quantity, quality or condition, such, for example, as pressure, force, position of a movable member, speed, intensity of flow, effect, momentum, temperature, heat contained in gases or fluids, efficiency, electrical and magnetic quantities, intensity of combustion, oxidation, reduction, composition of fluids, etc., to an auxiliary fluid condition, for instance, pressure, pressure difference, flow of fluid, vibrations of fluid, etc., whereby said fluid condition is a function of said quantity or quality and a measure therefor.

One object of the present invention is to provide in such a system means for producing vibrations in or slight relative movements between the relatively movable slidably cooperating parts of the system to reduce friction therebetween and thereby increase the sensitivity and accuracy of the system.

Another object of the invention is to provide such a system including a fluid motor for varying the fluid condition.

A further object is to provide a relay governor for varying or controlling the fluid condition and a relay motor for actuating said relay governor.

Other objects of the invention are to provide novel and improved means sensitive to the fluid condition for compensating or balancing the means sensitive to variations in the physical or chemical quantity or quality; and to obtain other results and advantages as may be brought out by the following description.

In the accompanying drawing the figure is a diagrammatic illustration of a system embodying my invention.

For the purpose of illustration, the physical or chemical quantity or quality is shown as in the form of a fluid under pressure which is conducted through a conduit 1 having a flow resistance device 2 therein, the said fluid pressure influencing or acting upon a diaphragm 4 arranged in a diaphragm chamber 5 through pipes 3 connected to the conduit 1 at opposite sides of the flow resistance device 2 and connected to the chamber 5 at opposite sides of the diaphragm 4. The diaphragm 4 is thus sensitive to difference in the pressure of fluid in conduit 1 at opposite sides of the device 2.

The auxiliary fluid condition is shown in the form of fluid under pressure which flows through a pipe 20 connected at one end to a cylinder 25 of a device sensitive to the said fluid condition, and connected at its other end to the cylinder 19 of a relay fluid governor and motor which varies the condition. The diaphragm 4 is provided with a rod 6 having at one end thereof a piston 26 mounted in the cylinder 25 so that the said piston 26 and cylinder 25 cooperate with the diaphragm 4 and chamber 5 to balance the system.

In accordance with the invention the fluid condition in pipe 20 is varied in accordance with variations in the fluid pressure in conduit 1, and to produce this result means responsive to departures from balance in the system is provided for controlling the variations in the fluid condition. Such means is shown as comprising a lever 7 pivotally mounted between its ends at 8 and having one end connected by a pin and slot connection to the rod 6. The other end of said lever is pivotally connected at 24 to one end of a second lever 13, the opposite end of which is pivotally connected at 23 to the piston rod 18ª of the piston 18 of the relay fluid motor and governor, which is controlled by a governor valve comprising the cylinder 16 and piston 15, the rod 14 of which is pivotally connected at 22 to the lever 13 intermediate its ends.

When the system is in balanced condition, that is, when the forces acting on the diaphragm 4 and the piston 26 have a balanced relation the piston 15 is in its neutral position so as to prevent flow of fluid to or from the relay motor. Upon departure from balance in the system, for instance, upon variations in the flow of the fluid in conduit 1, the diaphragm 4 is moved in one direction or the other and in turn oscillates the lever 7 about its pivot 8. The movement of the lever 7 is transmitted to the lever 13 to move the valve piston 15 in one direction to admit fluid to one end of the relay governor and from the other end through pipes 17, the lever 13 moving about its pivot 23. The piston 18 of the relay governor and motor is thus moved in one direction to admit fluid through pipes 21 to or from the pipe 20 and vary the fluid condition in the cylinder 25 behind the piston 26. The fluid condition is thus varied to compensate or balance the quantity or quality actuating the diaphragm 4, in other words, the difference in pressure at opposite sides of the flow resistance device 2. Movement of the piston 18 causes oscillation of the lever 13 about its pivot 24, which, in turn, returns the valve 15 to its neutral position to again restore balance in the system. The fluid condition actuating the piston 26 is a function of the quantity or quality, and preferably a manometer 28 is connected to the cylinder 25 to measure the fluid condition.

To reduce friction between the relatively movable slidably cooperating parts of the system and thereby increase the sensitivity and accuracy of the system, the pivot 8 of the lever 7 may be mounted on a rod 8ª slidable through a fixed support 9, and compression springs 10 interposed between the opposite ends of said rod and the support. The end of the rod 8ª opposite the pivot 8 is provided with a roller 11 maintained in constant engagement with a rotating cam 12. Rotation of the said cam causes rapid longitudinal movements or vibrations of the rod 8ª, which motions or vibrations are transmitted through the lever 7 to the rod 6 and piston 26 and through the lever 13 to the pistons 15 and 18. The rotation of the cam 20 may be constant or periodical at the time of the controlling movements of the parts of the system, and the vibrations or slight relative movements of the slidable cooperating parts, that is, the rod 6 and chamber 5, piston 26 and cylinder 25, pistons 15 and 18 and their respective cylinders, and the pivotal connections, reduce the friction therebetween so as to increase the sensitivity of the said parts during their controlling movements.

While I have shown the system embodying mechanisms of certain detail constructions it will be understood that this is only for illustrating the principles of the invention, and that many modifications and changes in the detail mechanism may be made without departing from the spirit or scope of the invention. Therefore, I do not wish to be understood as restricting myself except as required by the following claims when construed in the light of the prior art.

Having thus described the invention, what I claim is:

1. A system for measuring a variable condition by an auxiliary variable fluid condition, comprising means movably sensitive to the condition to be measured, means movably sensitive to an auxiliary fluid condition, said two means being arranged to have a balanced relation, means actuated by cooperation of said two means upon and as a function of a departure thereof from said balanced relation due to variation in the condition to be measured to vary said auxiliary fluid condition and restore said balanced relation, said hereinbefore-mentioned means including a plurality of relatively movable slidably cooperating parts, means for producing vibrations or slight relative movement of said parts independently of the operating movements thereof to reduce friction between said parts, and means for measuring said fluid condition.

2. A system for measuring a variable condition by an auxiliary variable fluid condition, comprising means including a member movably sensitive to variations in the condition to be measured, means including a member movably sensitive to variations in an auxiliary fluid condition, said two means being connected to have a balanced relation and each including a plurality of relatively movable slidably cooperating parts, means for varying said auxiliary fluid condition including a plurality of relatively movable slidably cooperating parts, means connected to and actuated by cooperation of said two sensitive means responsive to departures from said balanced relation thereof as a function of said departures to control said varying means and restore said balanced relation, said responsive means comprising a plurality of relatively movable slidably cooperating parts, means operatively connected to one of said parts for vibrating the same whereby all of said relatively slidably cooperating parts are vibrated to reduce friction therebetween, and means for measuring said auxiliary fluid condition.

3. A system for measuring a variable condition by an auxiliary variable fluid condition, comprising means movably sensitive to variations in the condition to be measured, means movably sensitive to variations in an auxiliary fluid condition, said two means being arranged to have a balanced relation and each including a plurality of relatively movable slidably cooperating parts, means operated by fluid energy for varying said auxiliary fluid condition including a plurality of relatively movable slidably cooperating parts, means connected to and actuated by cooperation of said two sensitive means responsive to departures from said balanced relation thereof as a function of said departures to control said varying means and restore said balanced relation, said responsive means comprising a plurality of relatively movable slidably cooperating parts, means operatively connected to one of said parts for vibrating the same whereby all of said relatively slidably cooperating parts are vibrated to reduce friction therebetween, and means for measuring said auxiliary fluid condition.

4. A system for measuring a variable condition by an auxiliary variable fluid condition, comprising means movably sensitive to variations in the condition to be measured, means movably sensitive to variations in an auxiliary fluid condition, said two means being arranged to have a balanced relation, a relay governor and motor for varying said auxiliary fluid condition, a governor for controlling said relay motor, means actuated by cooperation of said two sensitive means upon and as a function of a departure from said balanced relation to actuate said governor to cause variations in said auxiliary fluid condition and restore said balanced relation, and means for measuring said auxiliary fluid condition.

5. A system for measuring a variable condition by an auxiliary variable fluid condition, comprising means movably sensitive to variations in the condition to be measured, means movably sensitive to variations in an auxiliary fluid condition, said two means being arranged to have a balanced relation, a relay governor and motor for varying said auxiliary fluid condition, a governor for controlling said relay motor, means actuated by cooperation of said two sensitive means upon and as a function of a departure from said balanced relation to actuate said relay governor to cause variations in said auxiliary fluid condition and restore said balanced relation, the hereinbefore means including a plurality of relatively movable slidably cooperating parts, means for producing relative vibrations or slight movement of said parts independently of their operating movements to reduce friction between said parts, and means for measuring said auxiliary fluid condition.

6. A system for measuring a variable condition by an auxiliary variable fluid condition, comprising means movably sensitive to variations in the condition to be measured, means movably sensitive to variations in an auxiliary fluid condition, said two means being arranged to have a balanced relation and each including a plurality of relatively movable slidably cooperating parts, a cylinder and piston valve for varying said auxiliary fluid condition, a fluid motor for actuating said valve, a relay governor valve for controlling flow of fluid to and from said fluid motor, means connected to and actuated by cooperation of said first two-mentioned means upon and as a function of a departure thereof from said balanced relation for actuating said relay governor valve to cause variations in said auxiliary fluid condition and restore said balanced relation, said last-mentioned means comprising a plurality of relatively movable slidably cooperating parts, means for vibrating the relatively movable slidably cooperating parts of the system to reduce friction therebetween, and means for measuring said auxiliary fluid condition.

7. A system for measuring a variable condition by an auxiliary variable fluid condition, comprising means movably sensitive to variations in the condition to be measured, means movably sensitive to variations in an auxiliary fluid condition, said two means being arranged to have a balanced relation and each including a plurality of relatively movable slidably cooperating parts, a cylinder and piston valve for varying said auxiliary fluid condition, a fluid motor for actuating said valve, a relay governor valve for controlling flow of fluid to and from said fluid motor, means connected to and actuated by cooperation of said first two-mentioned means upon and as a function of a departure thereof from said balanced relation for actuating said relay governor valve to cause variations in said auxiliary fluid condition and restore said balanced relation, said last-mentioned means comprising a plurality of relatively movable slidably cooperating parts, the slidably cooperating parts of said first two-mentioned means, said cylinder and piston valve, said fluid motor, said relay governor valve and said last-mentioned means being so connected that vibrations in one of said parts are transmitted to the other parts, means for vibrating one of said parts to produce relative vibrations in all of said slidably cooperating parts to reduce friction therebetween, and means for measuring said auxiliary fluid condition.

8. A system for measuring a variable condition by an auxiliary variable fluid condition, comprising means movably sensitive to variations in the condition to be measured, a cylinder, a piston device therein and sensitive to variations in pressure in an auxiliary fluid, said means and said device being arranged to have a balanced relation, means actuated by cooperation of said means and said device upon and as a function of a departure from said balanced relation due to variations in said condition to be measured for varying the flow of said auxiliary fluid to said device to restore said balanced relation, and means for measuring the pressure of said auxiliary fluid actuating said piston device.

9. A system for measuring a variable condition by an auxiliary variable fluid condition, comprising means movably sensitive to variations in the condition to be measured, a cylinder, a piston device therein and sensitive to variations in pressure in an auxiliary fluid, said means and said device being arranged to have a balanced relation, means actuated by cooperation of said means and said device upon and as a function of a departure from said balanced relation due to variations in said condition to be measured for varying the flow of said auxiliary fluid to said device to restore said balanced relation, said first-mentioned means, said cylinder and piston device and the last-mentioned means each including a plurality of relatively movable slidably cooperating parts, means for producing relative vibrations or slight motion of the relatively movable slidably cooperating parts of the system to reduce friction therebetween, and means for measuring the pressure of said auxiliary fluid actuating said piston device.

ERICH ROUČKA.